US009900639B2

(12) United States Patent
Mares et al.

(10) Patent No.: US 9,900,639 B2
(45) Date of Patent: Feb. 20, 2018

(54) TEMPORARY VIEWER ACCESS TO VIDEOS FROM PROGRAMMERS WHILE MULTICHANNEL VIDEO PROGRAMMING DISTRIBUTORS ARE UNAVAILABLE FOR AUTHENTICATION AND AUTHORIZATION

(71) Applicant: Adobe Systems Incorporated, San Jose, CA (US)

(72) Inventors: Robert Mares, Bucharest (RO); Robert Calangiu, Bucharest (RO); Ovidiu Eftimie, Bucharest (RO); George Horia Galatanu, Lafayette, CA (US); George Alexandru Barbu, Bucharest (RO); Adrian George Silaghi, Bucharest (RO)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/005,538

(22) Filed: Jan. 25, 2016

(65) Prior Publication Data

US 2017/0214953 A1 Jul. 27, 2017

(51) Int. Cl.
| H04N 7/16 | (2011.01) |
| H04N 21/254 | (2011.01) |
| H04N 21/2543 | (2011.01) |
| H04N 21/262 | (2011.01) |
| H04N 21/2387 | (2011.01) |

(Continued)

(52) U.S. Cl.
CPC ..... *H04N 21/2541* (2013.01); *H04N 21/2387* (2013.01); *H04N 21/2393* (2013.01); *H04N 21/2543* (2013.01); *H04N 21/262* (2013.01); *H04N 21/4627* (2013.01)

(58) Field of Classification Search
CPC ........... H04N 21/2541; H04N 21/2387; H04N 21/2543; H04N 21/262; H04N 21/4627
See application file for complete search history.

(56) References Cited

U.S. PATENT DOCUMENTS

| 2002/0199188 A1* | 12/2002 | Sie .......................... H04N 21/00 725/35 |
| 2006/0107285 A1* | 5/2006 | Medvinsky .......... H04N 7/1675 725/25 |

(Continued)

*Primary Examiner* — Oleg Asanbayev
*Assistant Examiner* — Susan X Li
(74) *Attorney, Agent, or Firm* — Kilpatrick Townsend & Stockton LLP

(57) ABSTRACT

Methods and systems for granting temporary access to videos from a programmer to viewers based on the viewers having subscriptions with a separate MVPD. An exemplary technique involves receiving a request for the programmer to provide a video to a viewer and accessing the MVPD to authenticate that the viewer has a subscription with the MVPD and confirm that the viewer is authorized to receive the video. The technique determines that the MVPD is not able to timely authenticate the viewer subscription or confirm that the viewer is authorized to receive the video. While waiting for the MVPD to respond, the viewer is granted temporary access to the video. When a subsequent response from the MVPD is received, the technique continues to grant access to the viewer to the video from the programmer or cuts off access of the viewer to the video from the programmer based on the response.

10 Claims, 6 Drawing Sheets

(51) Int. Cl.
*H04N 21/4627* (2011.01)
*H04N 21/239* (2011.01)

(56) References Cited

U.S. PATENT DOCUMENTS

| | | | | |
|---|---|---|---|---|
| 2010/0185466 | A1* | 7/2010 | Paradis | G06Q 20/20 705/4 |
| 2013/0347025 | A1* | 12/2013 | Prakash | H04N 21/2541 725/25 |
| 2014/0007198 | A1* | 1/2014 | Durbha | H04L 63/102 726/4 |
| 2014/0317660 | A1* | 10/2014 | Cheung | H04N 21/6175 725/44 |

* cited by examiner

TEMPORARY VIEWER ACCESS TO VIDEOS FROM PROGRAMMERS WHILE MULTICHANNEL VIDEO PROGRAMMING DISTRIBUTORS ARE UNAVAILABLE FOR AUTHENTICATION AND AUTHORIZATION

FIELD OF THE INVENTION

This disclosure relates generally to computer-implemented methods and systems and more particularly relates to improving the efficiency and effectiveness of computing systems providing television and other video services through electronic communication networks.

BACKGROUND OF INVENTION

Multichannel video programming distributors (MVPDs), such as cable companies, provide multiple television channels to subscribers over dedicated networks. The individual television channel content offered to subscribers is typically provided by numerous, different programmers. For example, a typical MVPD offers 100 or more television channels from 50 or more different programmers and delivers the television content for all of those channels through cable or telephone wires to the homes of its subscribers.

As use of the Internet and mobile computing devices has grown, viewers have begun to seek programmer video channels through the Internet, on mobile phones, and by directly looking for media programmer provided content outside of the dedicated MVPD networks. For example, a given viewer will have a subscription with a cable television company, MVPD A, and be able to watch a local National Football League (NFL) football game on his home television on channel B, which is provided by media programmer B. Existing systems allow the viewer to also watch the NFL football game and other channel content even when the viewer is not at home (and thus cannot access the MVPD dedicated network). For example, the viewer accesses a website or mobile device app provided by media programmer B and programmer B provides the video directly to the viewer through the Internet after confirming that doing so is consistent with the viewer's subscription to the MVPD. Specifically, programmer B provides the video based on checking with the MVPD to authenticate the viewer's subscription and/or confirm that the viewer is authorized to receive the particular video content, e.g., the football game in this example.

While existing systems in which programmers provide video to viewers based on MVPD authentication and authorization facilitate viewer access to subscription content when subscribers are away from MVPD dedicated networks, the existing systems do not adequately respond when problems arise with the MVPD authentication and authorization. For example, the MVPD servers are sometimes overwhelmed with requests during large, live events, breaking news, and other videos that draw a large audience. The MVPDs are often not able to process requests due to having to process the extreme volume in such circumstances and the result is that many viewers do not have access to the videos at all or end up experiencing long delays without having access to the videos.

SUMMARY

One embodiment of the invention provides a technique for granting temporary access when an MVPD is unavailable. The technique is used in a network environment in which a programmer provides video content to viewers based on the viewers having subscriptions with the separate MVPD. The technique involves receiving a request for the programmer to provide a video to a viewer and accessing the MVPD to authenticate that the viewer has a subscription with the MVPD or confirm that the viewer is authorized to receive the video. The technique determines that the MVPD is not able to, within a predetermined time period, authenticate the viewer subscription or confirm that the viewer is authorized to receive the video. For example, if the MVPD does not respond within a predetermined time threshold, the technique determines that the MVPD is unavailable. While waiting for the unavailable MVPD to respond, the viewer is granted temporary access to the video from the programmer. When a subsequent response from the MVPD is received regarding authentication of the viewer subscription or authorization of the viewer to receive the video, the technique continues to grant access to the viewer to the video from the programmer or cuts off access of the viewer to the video from the programmer based on the response. In additional or alternative implementations the granting of temporary access when an MVPD is unavailable is based on a rule that is programmer-specific, channel-specific, and/or device-specific to allow the programmer flexibility in addressing MVPD unavailability.

These illustrative features are mentioned not to limit or define the disclosure, but to provide examples to aid understanding thereof. Additional embodiments are discussed in the Detailed Description, and further description is provided there.

DETAILED DESCRIPTION

Figure 1:
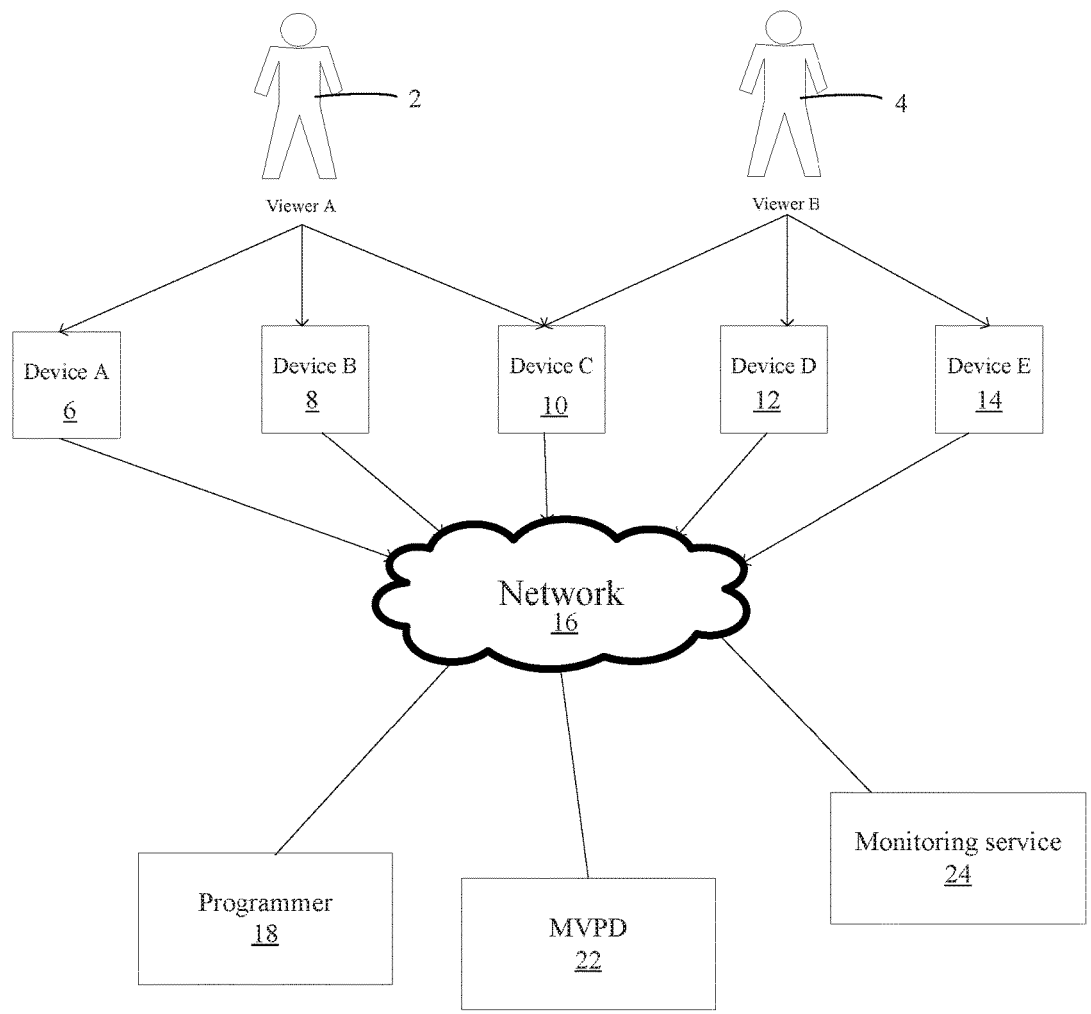
FIG. 1 is a block diagram depicting an example of a system in which exemplary viewers receive video from a programmer over a network.

As described above, while existing systems in which media programmers provide video to viewers based on MVPD authentication and authorization facilitate viewer access to subscription content when subscribers are away from MVPD dedicated networks, existing systems do not adequately respond when MVPD authentication and authorization is not available. This problem is addressed by granting temporary access to viewers to access video from a programmer while waiting for the MVPD authentication and authorization to become available again. Once the MVPD responds, access continues if the user is authenticated and authorized to view the video or cut off if the user is not authenticated or not authorized to view the video. In this way, unlike with previous systems, viewers are able to receive videos from programmers during times when an MVPD is unavailable for authentication and/or authorization, for example, due to degradation from high volume during large, live events, breaking news, and other videos that draw a large audience.

Embodiments of the invention provide additional advantages over prior systems by allowing programmers to configure programmer-specific degradation response rules that specify how MVPD unavailable will be treated for the particular programmer, particular channels, and/or particular videos offered by the programmer. One exemplary rule specifies to provide videos to viewers who have previously been authenticated by the MVPD and to deny videos to viewers who have not previously been authenticated by the MVPD. This rule allows the programmer to exclude viewers who have never been authenticated by the MVPD before from having automatic temporary access. A programmer could use such a rule if it considers the chances of fraudulent access attempts high in a particular circumstance. This rule is applied for all of the programmer's channels in one embodiment, but provided for particular channels and/or particular videos in another embodiment.

Another exemplary rule specifies to provide video from a first channel of the programmer but withhold video from a second channel of the programmer when an MVPD is unavailable. For example, a programmer offering both a basic sports channel and a premium events pay-per-view sports channel could apply such a rule to ensure that no unauthenticated/unauthorized access to the pay-per-view sports channel is granted even during degradation, i.e., when the MVPD is unavailable, but allow access to viewers to the basic sports channel during those times. In this way, unlike prior systems, the programmer is enabled to maintain tighter control over high price, specialty, or other content to allow some viewers obtain video during times of MVPD unavailability.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

As used herein the term "programmer" refers to a person or business entity, or the electronic devices operated by the person or business entity, that provides video content made available on one or more channels provided by one or more MVPD. In one example, a programmer is an entity that creates and/or organizes content for multiple television channels. Programmers also make their video content available to viewers via networks other than the dedicated networks of the MVPDs. In one example, a programmer publishes a mobile device application for installation on client devices that accesses video content from the programmer directly for display on the mobile devices. In another example, a programmer publishes a website that includes a plugin or other component that accesses video content from the programmer directly for display on client devices.

As used herein the term "video" refers to time-based media content playable on a television or other electronic device. Video includes visual and/or audio content. In one example, video is provided over a network as a file that is saved locally on a client device for subsequent playback. In another example, video is streamed over a network for playback on the client device. A variety of types of electronic devices playback the video for a viewer. As examples, any of a television, desktop computer, laptop, mobile phone, mobile computing device, tablet, Internet-of-things device, thermostat, automobile electronic system, or any other electronic device having display and/or audio capabilities to display graphics or play sound can be used to play a streamed or downloaded video.

As used herein the term "viewer" refers to a person, or a device operated by the person, that requests and/or receives downloaded or streamed videos from a programmer or MVPD. A viewer has a subscription with an MVPD in one embodiment. In one embodiment, a viewer uses a mobile device with multiple apps that access publishers to receive and view videos based on subscription credentials for an MVPD that separately provides videos to the viewer through a separate dedicated network.

As used herein the term "subscription" refers to a viewer having an account to receive television or other videos for multiple channels from an MVPD. A subscription in one embodiment is time-based. For example, a viewer pays a monthly fee to receive television content from an MVPD cable company at the viewer's residence. In another embodiment, the viewer pays a monthly fee to access videos from multiple sources through the Internet and also uses the Internet to access additional videos directly from programmers through the Internet.

As used herein the terms "multichannel video programming distributor" and "MVPD" refer to a video provider that distributes videos for multiple channels from one or more programmers to multiple viewers. An MVPD typically provides videos based on viewer subscriptions and to viewers via a dedicated network. For example, a cable company provides multi-channel television videos over a cable network.

As used herein the term "authenticate" refers to determining that a viewer is associated with a particular identity, account, or subscription maintained by an MVPD. Authenticating a viewer is based on a viewer name and password provided by the viewer in one embodiment.

As used herein the term "authorized" refers to a viewer having permission based on the viewer's identity, account, or subscription with an MVPD to access a particular video. An authenticated viewer will have authorization to access some videos but not other videos in one example.

Referring now to the drawings, FIG. 1 is a block diagram depicting an example of a system in which exemplary viewers, viewer A 2 and viewer B 4, attempt to receive video from programmer 18 over network 16. In this example, viewer A 2 accesses the network 16 with device A 6, device B 8, and device C 10; and viewer B 4 accesses the network 16 with device C 10, device D 12, and device E 14. Both viewer A 2 and viewer B 4 access the network 16 with device C 10. It is possible for viewers to use any number of devices and for each device to be shared by any number of viewers. In this example, viewer A 2 and viewer B have subscriptions to receive television from MVPD 22 through a dedicated network (not shown). Viewer A 2 and viewer B 2 access video content on one or more of devices 6-14 by contacting programmer 18. Programmer 18 provides the requested videos if the subscriptions of the viewers are authenticated and the authorization for the particular videos is confirmed with MVPD 22. In this example, monitoring service 24 is used to authenticate the subscriptions and confirm the authorizations by contacting MVPD 22.

In some circumstances, the MVPD 22 is not available for authentication and/or authorization, for example, due to degradation from high volume during large, live events, breaking news, and other videos that draw a large audience. In these circumstances, the monitoring service 24 determines to grant temporary access to the requesting viewers 2, 4. The monitoring service 24 continues to seek a response from MVPD 22 and, when a response is received, determines to continue the programmer 18 providing the video or cut off the provision of the video based on the response. For example, if a response from the MVPD indicates that the viewer A is not authorized to watch a video that is being streamed based on a temporary grant of access, the monitoring service 24 will instruct the programmer 18 to cut off the streaming of the video.

Figure 2:
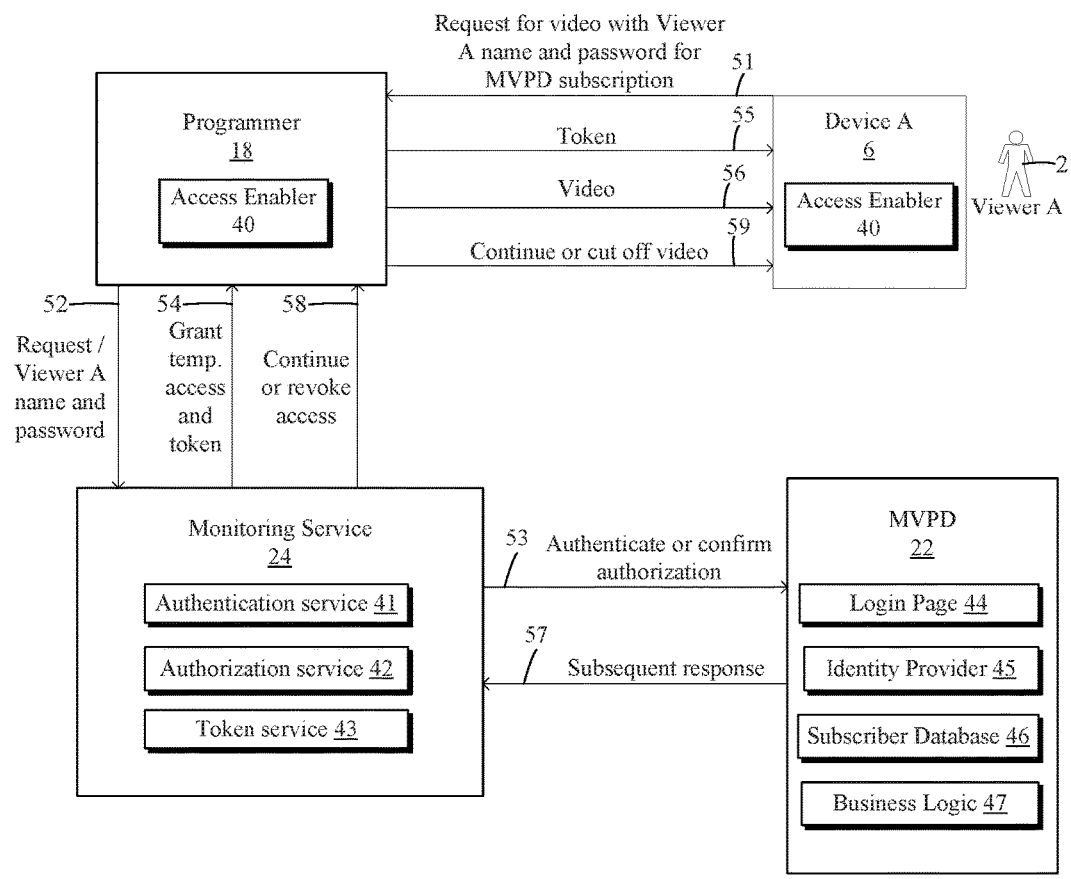
FIG. 2 is a block diagram illustrating communication between client devices, a programmer device, a monitoring service, and an MVPD backend.

FIG. 2 is a block diagram illustrating communication between client devices, a programmer device 18, a monitoring service, and an MVPD backend. FIG. 2 illustrates an access enabler 40 on client device A 6 and programmer device 18. The programmer 18 interacts with the monitoring service 24 via the access enabler 40. The access enabler 40 facilitates authentication and authorization confirmation. The monitoring service 24 then facilitates all authentication and authorization confirmation interactions. The access enabler 40 also runs locally on the viewer's device A 6. When the viewer A 2 accesses the programmer's website or app and requests a video, the access enablers 40 runs in the background to authenticate and confirm authorization of the user for the requested video.

In FIG. 2, a request for a video is sent from the device A 6 to the programmer 18. The respective access enablers 40 facilitate this communication between the devices 6, 18. The request identifies a name and password for the viewer A 2 that identify the viewer A identity, account, or subscription to the MVPD 22. Alternative credentials are used in other embodiments. The programmer 18 sends the request and viewer A name and password to the monitoring service 24 in communication 52. The access enabler 40 on programmer 18 sends this communication, for example, based on being configured to authenticate and authorize viewers with the monitoring service 24.

The monitoring service 24 includes an authentication service 41, an authorization service 42, and a token service 43. Based on receiving communication 52, the authentication service 41 and an authorization service 42 compose a message 53 to the MVPD 22 to authenticate the viewer A 2 by determining whether the viewer name and password match those of an authorized viewer identify, account, or subscription maintained by the MVPD 22 or an accessible third party. For example, the message 53 accesses a login page 44 and provides the viewer name and password to attempt a login. In one example, the MVPD 22 uses an identity provider 45 component that confirms the identity of the viewer with a third-party identity service. In another example, the MVPD 22 uses a subscriber database 46 to determine whether the viewer A 2 is an authenticated viewer with a subscription to the MVPD 22. The message 53 also identifies the video requested by the viewer A 2 and/or the programmer 18 so that the MVPD 22 can determine whether the viewer A 2 is authorized to access the particular video or to access videos from the particular programmer 18. For example, if the viewer A 2's subscription does not include a premium movie channel, the viewer will not be authorized to have access to movies provided by the premium movie channel programmer. MVPD 22 also includes business logic 47 that includes business rules 47 making the authentication and authorization determinations. In one example, the business rules 47 identify what videos are available for different subscription classes, pay-per-view requirements for particular videos, and other business rules useful in controlling viewer authentication and/or authorization.

In the communication flow shown in FIG. 2, the monitoring service 24 does not receive an immediate response from MVPD 22 in response to message 53. After a predetermined amount of time passes, the monitoring service 24 determines that the MVPD is unable to provide a timely response and provides for temporary access for the viewer A 2 to the video from programmer 18. Specifically, monitoring service 24 generates a token using token service 43 and sends the token in a message 54 to grant temporary access. The message 54 is sent to programmer 18. Programmer 18 sends a message 55 with the token and streams or otherwise sends the video 56 to device A 6. The viewer A 2 is thus able to view the video 6 while the MVPD is unavailable. The token includes a time-to-live or other appropriate parameter based on the programmer's preferences. For example, a short time-to-live parameter is included if the programmer 18 desires tighter control of the video, i.e., requiring the viewer to request access again at the conclusion of the time-to-live period.

Once the MVPD becomes available again, it sends a subsequent message 57 with information identifying whether the viewer A 2 is authenticated and/or whether the viewer A 2 is authorized to watch the particular video and/or videos from the particular programmer 18. Based on this subsequent message 57, the monitoring service 24 sends a message 58 to the programmer 18 to continue the video or to revoke access to the video. The programmer 18, based on receiving message 58, sends message 59 device A 6 to implement continuing the video or cutting off the video. For example, the message 59 may extend the time-to-live on the token 55 or may include a new access or revocation token with parameters configured to allow the video to continue to completion or to cut off playback of the video. In the case of streaming of the video 55, the programmer 18 will stop streaming the video 55 if the message 58 indicates that access by the viewer 6 to the video should be revoked.

The access enabler 40 illustrated in FIG. 2 provides a modular solution for a programmer 18 wishing to implement MVPD-based authentication and authorization with sophisticated degradation capabilities in the programmer's app and website. The access enabler 40 is configured to run locally on device A 6 of the Viewer A 2, for example, as a plugin within an app or web page provided by the programmer 18 in one embodiment. The access enabler 40 on the device A 6 interacts with its counterpart access enabler 40 on the programmer 18 device to handle programmer-configured entitlement workflows in a flexible and secure manner. The programmer 18 creates and maintains the higher-level web page or app that implements a viewer software interface for viewing videos and simply incorporates the modular functionality of the access enabler 40 to implement the MVPD-based authentication and authorization with sophisticated degradation capabilities. The programmer 18, in one embodiment, specifies appropriate interactions using an asynchronous system of functions and callbacks defined by an Application Programming Interface (API) of the access enabler 40. Exemplary entitlement flows that are easily implemented using the API of the access enabler 40 include, but are not limited to, setting the programmer identity, checking or obtaining viewer authentication against a particular identity provider, checking or obtaining viewer authorization for a particular video or from a particular programmer, and logging out the viewer.

One embodiment of the invention bypasses an MVPD's authentication/authorization check while the MVPD is not available and instead provides temporary access to a video by a viewer for a set period of time or until the MVPD is determined to again be available. The result is that the viewer is not blocked from accessing video content that they should otherwise (absent the MVPD system unavailability) be able to access. Once the MVPD system is back online, normal functioning of the system can be resumed.

In certain cases, depending on the type of video, programmer, or other circumstances, the system allows the bypassing of authentication/authorization to occur according to particular rules. One exemplary rule is an "authenticate all" rule that allows all viewers (even those who have not previously authenticated with the system) to be granted access for a period of time, e.g., using a token. Another exemplary rule is an "authorize all" rule that allows only viewers who have previously authenticated with the system to be granted access for a period of time. Previously authenticated viewers are given temporary access to all videos for a particular programmer that implements this rule. Another exemplary rule is an "authorize none" rule that allows a programmer to identify particular channel(s) that viewers will not have access to when the MVPD is unavailable. In one example, this type of channel-specific control is useful to a programmer offering a basic channel and a premium access channel who implements the rule to avoid giving access to the premium access channel during MVPD unavailability.

Another novel aspect of embodiments of the invention relates to the processing of degradation rules, such as the above-described rules. For example, a programmer can configure the system to implement the rules in a pipeline mode, applying the rules one after another. As a specific example, if the system has already granted temporary access on two sports channels in an app provided by a given programmer, the "authenticate all" rule is configured to take precedent and the viewer will not be asked to enter a viewer name and password when attempting to access another video using the provider app. The pipeline specifies rules based on different scenarios and can be the implementation of a logical construct inside an execution block that interprets the rules.

Figure 3:
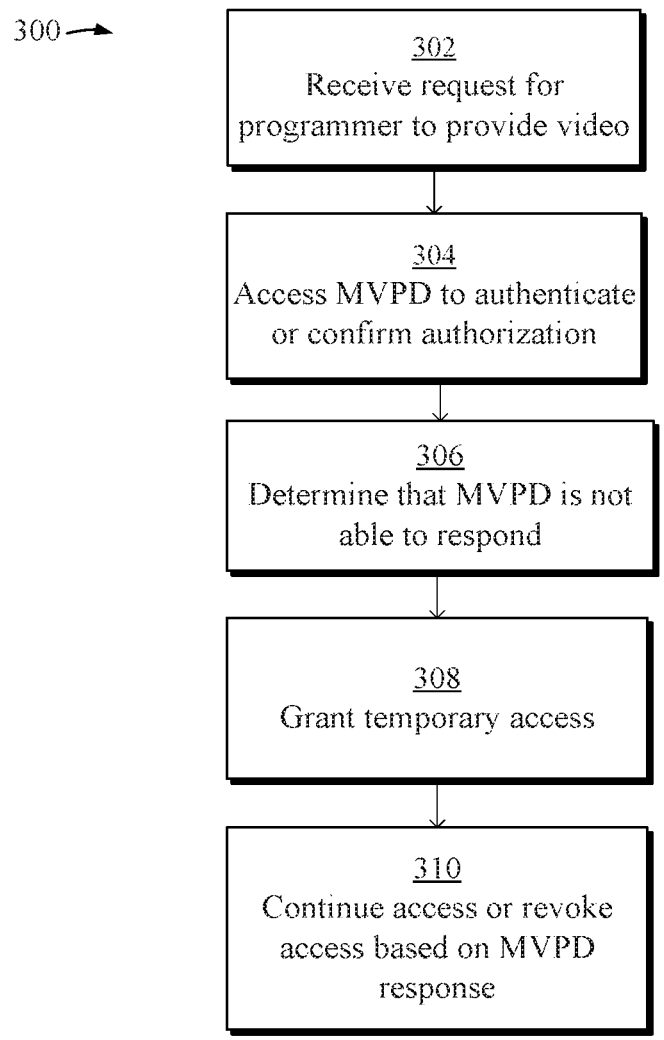
FIG. 3 is a flowchart illustrating an exemplary method for granting temporary access when an MVPD is unavailable.

FIG. 3 is a flowchart illustrating an exemplary method 300 for granting temporary access when the MVPD is unavailable. Method 300 is provided in an environment in which a programmer provides video content to viewers based on the viewers having subscriptions with a separate multichannel video programming distributor (MVPD). In one example, the MVPD provides television channels from the programmer and other programmers and the video is from a television channel from the programmer provided on one of the television channels.

In method 300, a request for a programmer to provide a video is received in block 302 and an MVPD is accessed to authenticate or confirm authorization in block 304. In one embodiment, the MVPD provides television channels from the programmer and other programmers using a dedicated network and the request for the programmer to provide the video to the viewer is received via a network different from the dedicated network and/or from a mobile device app or website accessed via an electronic device. In one embodiment accessing the MVPD involves accessing the MVPD to authenticate that the viewer has a subscription with the MVPD or confirm that the viewer is authorized to receive the video.

Next method 300 determines that the MVPD is not able to respond as shown in block 306. In one embodiment, this involves determining that the MVPD is not able to, within a predetermined time period, authenticate the viewer subscription or confirm that the viewer is authorized to receive the video. In one embodiment, determining that the MVPD is not able to, within a predetermined time period, authenticate the viewer subscription or confirm that the viewer is authorized to receive the video involves receiving login credentials from the viewer associated with a subscription to the MVPD and attempting to authenticate the subscription with the MVPD using the login credentials. In another embodiment, determining that the MVPD is not able to, within a predetermined time period, confirm that the viewer is authorized to receive the video involves attempting to confirm with the MVPD using the login credentials that the viewer is authorized to view the video according to the subscription.

In one embodiment, a monitoring service, separate from the programmer and MVPD, determines that the MVPD is not able to, within a predetermined time period, authenticate the viewer subscription or confirm that the viewer is authorized to receive the video. For example, this can be based on the monitoring service waiting for a predetermined amount of time to pass without receiving a response. In an alternative embodiment, the monitoring service determines that the MVPD is not available based on a history of communications with the MVPD and/or statistics regarding the MVPD. The history and/or statistics include information about attempts to contact the MVPD on behalf of multiple, different programmers in one embodiment. Because information for multiple programmers is used, MVPD issues are identified faster and more accurately than they otherwise would be identified.

Based on determining that the MVPD is unable to respond, the method 300 grants temporary access, as shown in block 308. This can involve providing a token to the viewer that includes a time-to-live parameter that limits the useful life of the token and thus limits the duration of the temporary access. The monitoring service, in one embodiment, applies a programmer-specific rule (such as the rules illustrated in FIGS. 4 and 5 and explained elsewhere herein) to grant the temporary access to the viewer to access the video from the programmer while waiting for the MVPD.

Based on an eventual MVPD response, the method 300 continues the access or revokes the access, as shown in block 310. In one embodiment, this involves continuing to grant access by the viewer to the video from the programmer or cutting off access of the viewer to the video from the programmer based on the subsequent response from the MVPD regarding authentication of the viewer subscription or authorization of the viewer to receive the video.

Figure 4:
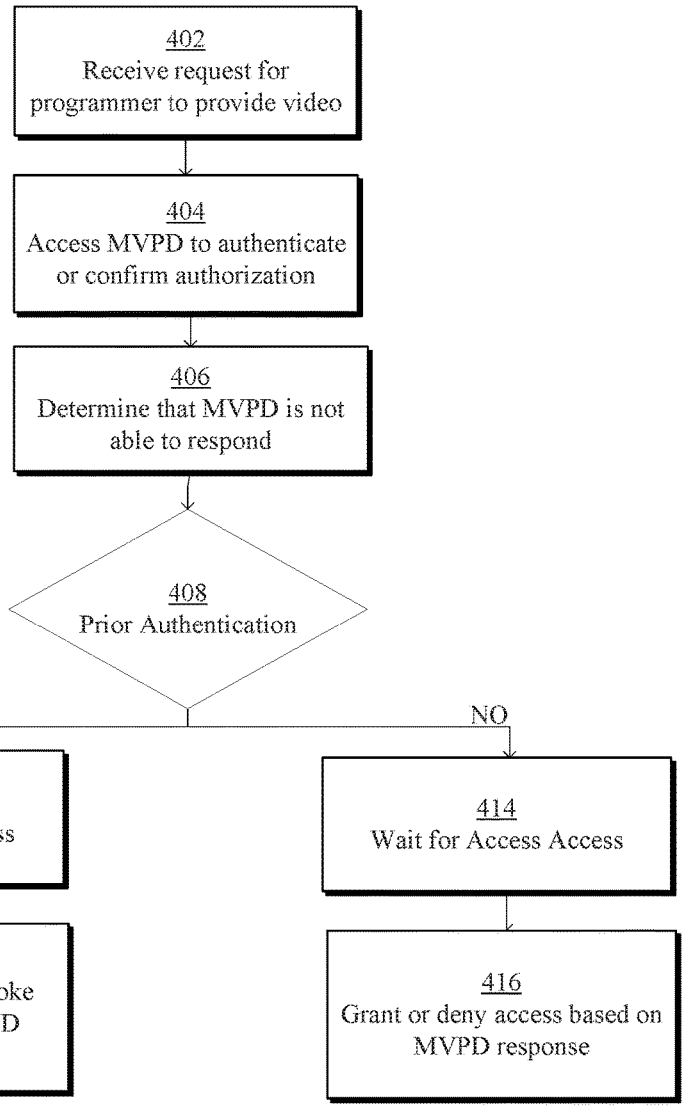
FIG. 4 is a flowchart illustrating an exemplary method for granting temporary access when an MVPD is unavailable based on a rule.

FIG. 4 is a flowchart illustrating an exemplary method 400 for granting temporary access when the MVPD is unavailable based on a rule. Method 400 is provided in an environment in which a programmer provides video content to viewers based on the viewers having subscriptions with a separate MVPD. FIG. 4 provides an example of application of an "authorize all" rule.

In method 400, a request for a programmer to provide a video is received in block 402, an MVPD is accessed to authenticate or confirm authorization in block 404, and the method 400 determines that the MVPD is not able to respond as shown in block 406. These steps 402, 404, and 406 involve similar features as discussed herein with respect to steps 302, 304, and 306 of FIG. 3, respectively.

In decision block 408, method 400 determines whether the viewer has previously authenticated with the MVPD. This determination is made by a service, such as monitoring service 24 of FIG. 2, separate from the MVPD. To make the determination, the service maintains records of prior viewer authentications with particular MVPDs for particular programmers.

If the viewer has previously authenticated with the MVPD, the method 400 grants temporary access to the user, as shown in block 410. When a subsequent response is received from the MVPD, the method 400 continues access or revokes access to the video based on the subsequent response, as shown in block 412.

If the viewer has not previously authenticated with the MVPD, the method 400 does not grant access (and thus withholds access to the video) while waiting for a response from the MVPD, as shown in block 414. When a subsequent response is received from the MVPD, the method 400 grants access based on the subsequent response, as shown in block 416.

Figure 5:
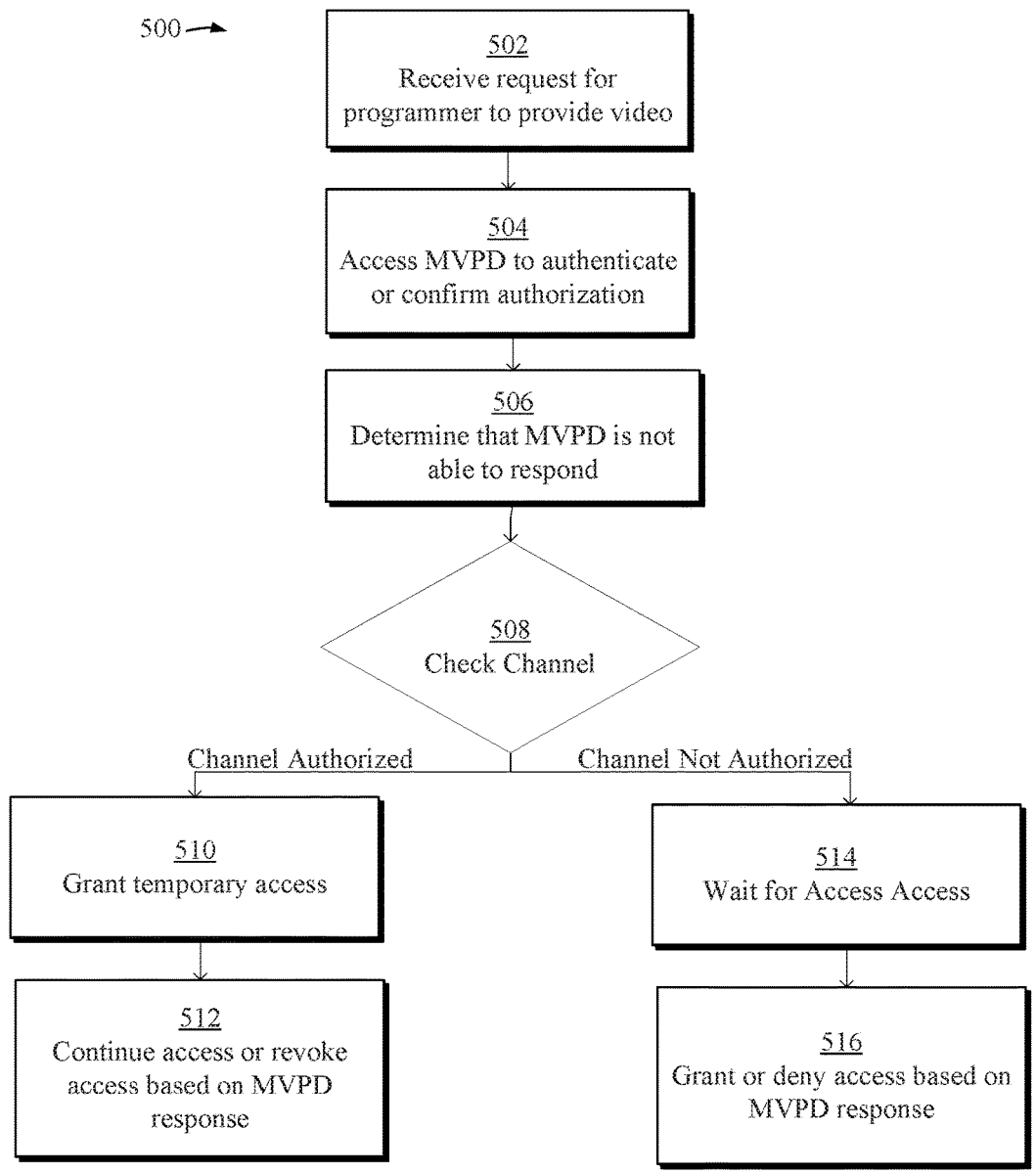
FIG. 5 is a flowchart illustrating an exemplary method for granting temporary access when an MVPD is unavailable based on a channel-specific rule.

FIG. 5 is a flowchart illustrating an exemplary method 500 for granting temporary access when the MVPD is unavailable based on a channel-specific rule. Method 500 is provided in an environment in which a programmer provides video content to viewers based on the viewers having subscriptions with a separate MVPD. FIG. 4 provides an example of application of a channel-specific "authorize none" rule.

In method 500, a request for a programmer to provide a video is received in block 502, an MVPD is accessed to authenticate or confirm authorization in block 504, and the method 400 determines that the MVPD is not able to respond as shown in block 506. These steps 502, 504, and 506 involve similar features as discussed herein with respect to steps 302, 304, and 306 of FIG. 3, respectively.

In decision block 508, method 500 determines whether a channel associated with the requested video is authorized or not authorized. This determination is made by a service, such as monitoring service 24 of FIG. 2, separate from the MVPD. To make the determination, the service maintains records of publisher channel preferences.

If the channel is authorized, the method 500 grants temporary access to the user, as shown in block 510. When a subsequent response is received from the MVPD, the method 500 continues access or revokes access to the video based on the subsequent response, as shown in block 512.

If the channel is not authorized, the method 500 does not grant access (and thus withholds access to the video) while waiting for a response from the MVPD, as shown in block 514. When a subsequent response is received from the MVPD, the method 500 grants access based on the subsequent response, as shown in block 516.

Exemplary Computing Environment

Figure 6:
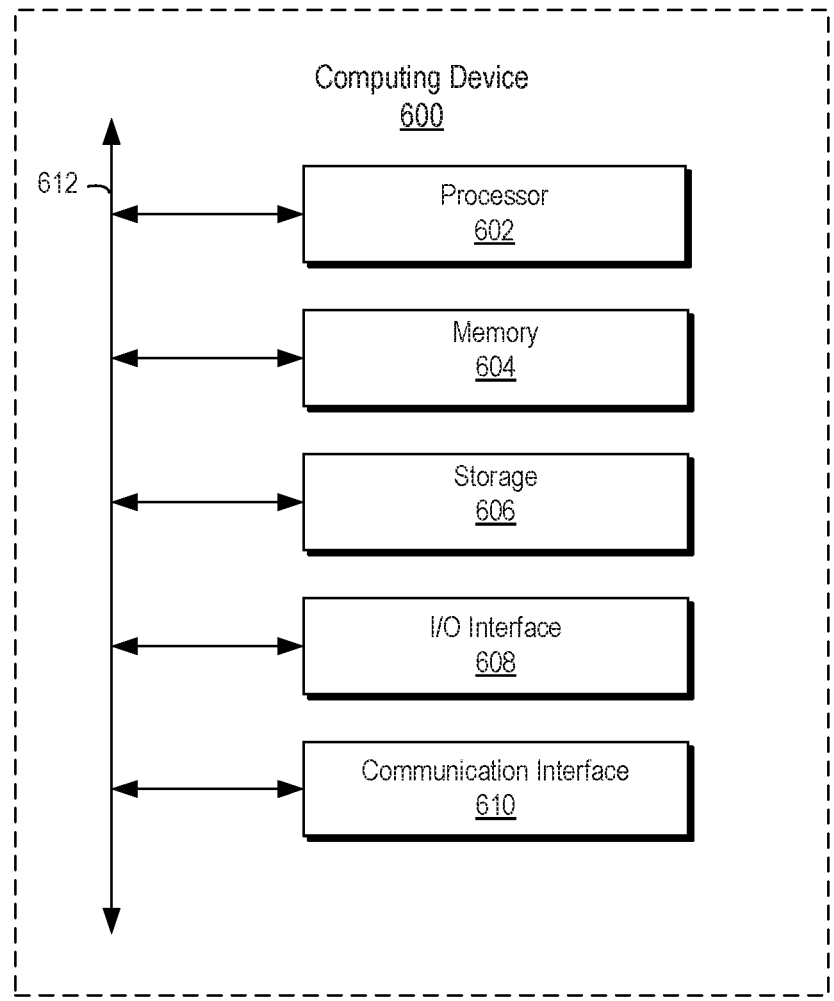
FIG. 6 is a block diagram depicting an example of a computing system used to implement certain embodiments of the invention.

Any suitable computing system or group of computing systems can be used to implement the techniques and methods disclosed herein. For example, FIG. 6 is a block diagram depicting examples of implementations of such components. The computing device 600 can include a processor 602 that is communicatively coupled to a memory 604 and that executes computer-executable program code and/or accesses information stored in memory 604 or storage 606. The processor 602 may comprise a microprocessor, an application-specific integrated circuit ("ASIC"), a state machine, or other processing device. The processor 602 can include one processing device or more than one processing device. Such a processor can include or may be in communication with a computer-readable medium storing instructions that, when executed by the processor 602, cause the processor to perform the operations described herein.

The memory 604 and storage 606 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 600 may also comprise a number of external or internal devices such as input or output devices. For example, the computing device is shown with an input/output ("I/O") interface 608 that can receive input from input devices or provide output to output devices. A communication interface 610 may also be included in the computing device 600 and can include any device or group of devices suitable for establishing a wired or wireless data connection to one or more data networks. Non-limiting examples of the communication interface 610 include an Ethernet network adapter, a modem, and/or the like. The computing device 600 can transmit messages as electronic or optical signals via the communication interface 610. A bus 612 can also be included to communicatively couple one or more components of the computing device 600.

The computing device 600 can execute program code that configures the processor 602 to perform one or more of the operations described above. The program code can include one or more modules. The program code may be resident in the memory 604, storage 606, or any suitable computer-readable medium and may be executed by the processor 602 or any other suitable processor. In some embodiments, modules can be resident in the memory 604. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. In an environment in which a programmer provides video content to viewers based on the viewers having subscriptions with a multichannel video programming distributor (MVPD) that is separate from a monitoring service that is executed by a computing system, a method for granting temporary access to video content when the MVPD is unavailable, the method comprising:
   receiving, by the monitoring service executed by a computing system, login credentials for a viewer and a request for the programmer to provide a video to the viewer;
   accessing, by the monitoring service, the MVPD to authenticate that the viewer has a subscription with the MVPD or confirm that the viewer is authorized to receive the video;
   determining, by the monitoring service, that the MVPD is in a state preventing the MVPD from being able to, within a predetermined time period, authenticate the viewer subscription or confirm that the viewer is authorized to receive the video, wherein the determination is based on statistics regarding multiple programmers accessing the MVPD to authenticate subscriptions and viewer authorizations;
   applying a rule that (i) is specific to the programmer and (ii) specifies that the monitoring service is to provide video from a first channel of the programmer but withhold video from a second channel of the programmer;
   granting, by the monitoring service, a temporary access to the viewer to access the video from the programmer while waiting for the MVPD to exit the state preventing authentication by the MVPD or authorization by the MVPD; and
   performing, by the monitoring service and based on a subsequent response from the MVPD regarding authentication of the viewer subscription or authorization of the viewer to receive the video, one of (i) continuing to grant access to the viewer to the video from the programmer or (ii) cutting off access of the viewer to the video from the programmer.

2. The method of claim 1, wherein the monitoring service determines that the MVPD is not able to authenticate the viewer subscription or confirm that the viewer is authorized to receive the video is based on statistics regarding the MVPD based on multiple programmers accessing the MVPD to authenticate subscriptions and viewer authorizations.

3. The method of claim 1, applying a rule to determine whether the programmer will provide the video to the viewer, wherein the rule is specific to the programmer and specifies to provide video from a first channel of the programmer but withhold video from a second channel of the programmer.

4. The method of claim 1, wherein the MVPD provides television channels from the programmer and other programmers, wherein the video is from a television channel from the programmer provided on one of the television channels.

5. The method of claim 1, wherein determining that the MVPD is not able to, within a predetermined time period, authenticate the viewer subscription or confirm that the viewer is authorized to receive the video comprises:
   receiving login credentials from the viewer associated with a subscription to the MVPD; and
   attempting to confirm with the MVPD using the login credentials that the viewer is authorized to view video according to the subscription.

6. The method of claim 1, wherein the MVPD provides television channels from the programmer and other programmers using a dedicated network, wherein the request for the programmer to provide the video to the viewer is received via a network different from the dedicated network.

7. The method of claim 6, wherein the viewer requests to view the video on a mobile device.

8. The method of claim 7, wherein the viewer requests to view the video using an app provided by the programmer on the mobile device.

9. The method of claim 6, wherein the viewer requests to view the video using a web browser accessing a web page.

10. In an environment in which a programmer provides video content to viewers based on the viewers having subscriptions with a separate multichannel video programming distributor (MVPD) that is separate from a monitoring service, a method for granting temporary access to video content when the MVPD is unavailable, the method comprising:
    receiving, by the monitoring service that is executed by a computing system, login credentials associated with a viewer and a request for the programmer to provide a video to the viewer;
    accessing, by the monitoring service, the MVPD to authenticate that the viewer has a subscription with the MVPD or confirm that the viewer is authorized to receive the video;
    determining, by the monitoring service, that the MVPD is not able to, within a predetermined time period, authenticate the viewer subscription or confirm that the viewer is authorized to receive the video, wherein the determination is based on statistics regarding multiple programmers accessing the MVPD to authenticate subscriptions and viewer authorizations;

applying, by the monitoring service, a rule that is specific to the programmer and that specifies that the monitoring service is to provide video from a first channel of the programmer and to withhold video from a second channel of the programmer; and
based on applying the rule, providing, by the monitoring service, the video from the programmer to the viewer.

\* \* \* \* \*